United States Patent [19]

Clark

[11] Patent Number: 4,653,135
[45] Date of Patent: Mar. 31, 1987

[54] ADJUSTABLE LENGTH FINISHING PAD

[76] Inventor: Gaylord J. Clark, 4769 Paw Paw Lake Rd., Coloma, Mich. 49038

[21] Appl. No.: 762,650

[22] Filed: Aug. 5, 1985

Related U.S. Application Data

[63] Continuation-in-part of Ser. No. 599,407, Apr. 12, 1984, Pat. No. 4,567,619.

[51] Int. Cl.⁴ .............................................. B60S 3/06
[52] U.S. Cl. .................. 15/230.16; 15/97 B; 15/230.19; 15/DIG. 2; 51/334
[58] Field of Search ............ 15/97 B, DIG. 2, 230.16, 15/230.19, 230.14, 230.17, 183, 195, 199, 204, 205; 51/334, 337

[56] References Cited

U.S. PATENT DOCUMENTS

| | | |
|---|---|---|
| 1,685,406 | 9/1928 | Kimman ........................... 15/230.16 |
| 2,194,577 | 3/1940 | Vonnegut . |
| 2,854,798 | 10/1958 | De Haven . |
| 3,869,833 | 3/1975 | Belanger . |
| 4,018,014 | 4/1977 | Belanger ........................... 15/230.19 |
| 4,104,756 | 8/1978 | Gasser et al. ..................... 15/230.16 |
| 4,377,878 | 3/1983 | Pecora . |

FOREIGN PATENT DOCUMENTS 117489 7/1918 United Kingdom ................... 15/205

Primary Examiner—Edward L. Roberts
Attorney, Agent, or Firm—Flynn, Thiel, Boutell & Tanis

[57] ABSTRACT

A vehicle finishing apparatus having a rotary support, and a plurality of finishing units mounted on the support in spaced relationship therearound. Each finishing unit includes a thin sheetlike pad structure of flexible material having an outer free edge adapted to contact a vehicle, and an inner edge positioned adjacent the periphery of the support. Mounting structure cooperates between the support and the pad structure for releasably securing the pad structure to the support and for selectively varying the point of attachment thereof to the support to vary the length of the pad structure which projects outwardly from the support. The mounting structure includes a plurality of identical mounting parts fixedly associated with the pad structure in substantially parallel but closely spaced relationship in the vicinity of the inner edge but progressively spaced therefrom.

9 Claims, 6 Drawing Figures

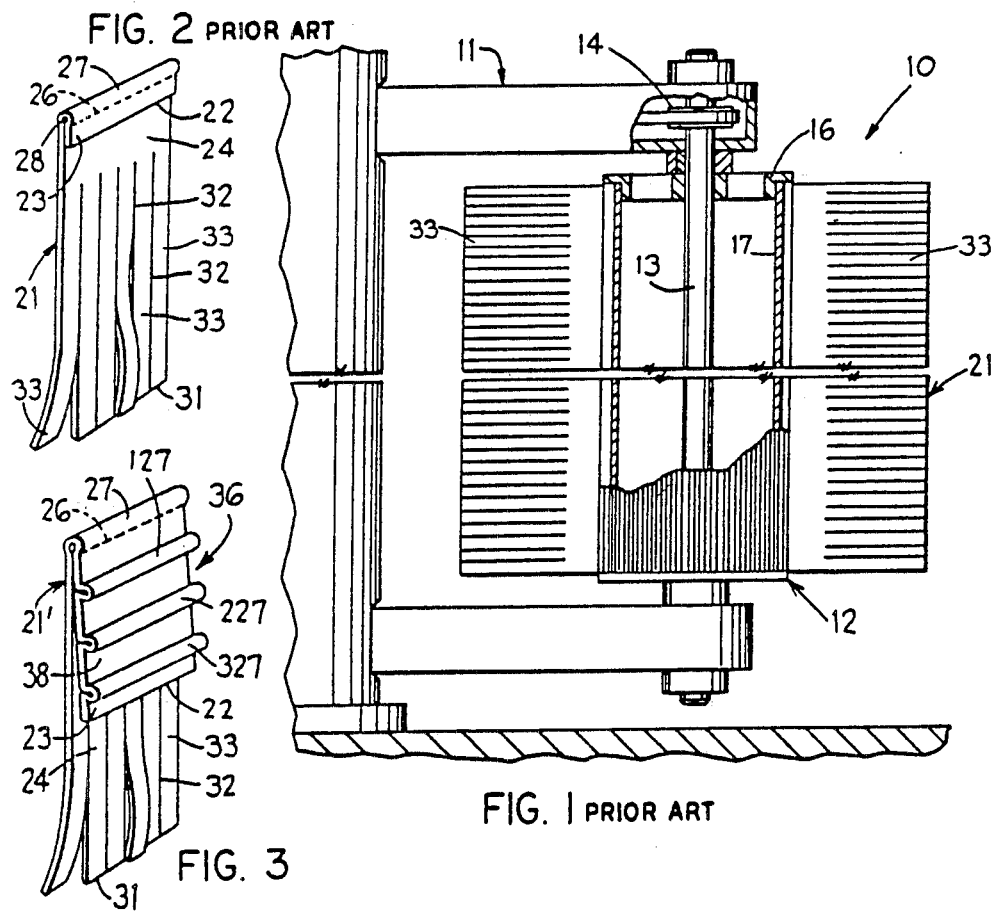
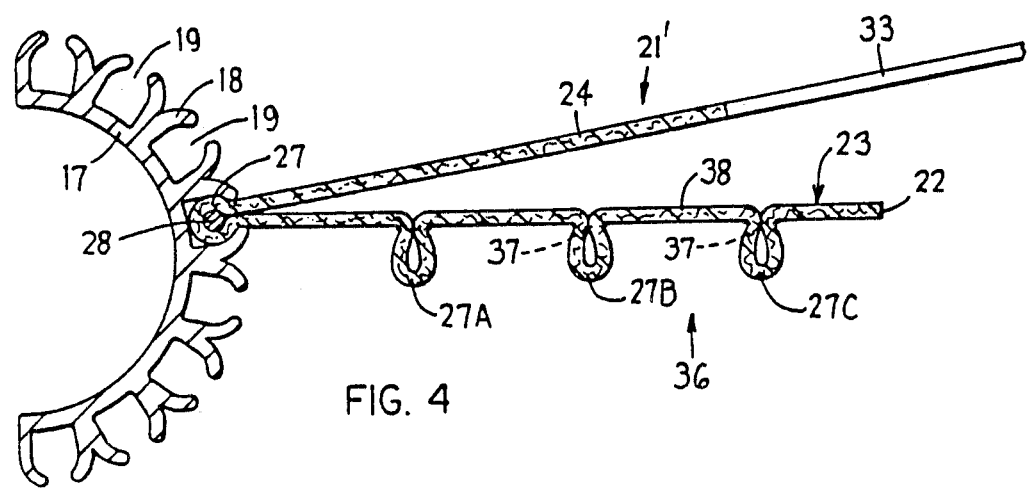

ADJUSTABLE LENGTH FINISHING PAD

CROSS REFERENCE TO RELATED APPLICATION

This application is a continuation-in-part of my copending application Ser. No. 599,407, filed Apr. 12, 1984, now Pat. No. 4,567,619.

FIELD OF THE INVENTION

This invention relates to a vehicle finishing apparatus and, more particularly, to an improved finishing element, specifically a finishing cloth or pad, which is of adjustable length.

BACKGROUND OF THE INVENTION

Finishing devices such as car finishing brushes and polishing or buffing devices are extensively utilized in automatic car and truck finishing machinery of the type wherein remotely or automatically controlled equipment is used to wash, wax, polish or buff the surface of the vehicle. Conventionally, these finishing devices include a drum biased toward the vehicle, which drum rotates to cause finishing elements on the drum to wash, dry, polish or otherwise contact the vehicle's surface.

For many years these finishing drums have constituted brushes in that the drum was provided with a plurality of elongated flexible brush bristles, such as flexible plastic filaments, for finishing contact with the vehicle surface. However, many of the finishing devices have now eliminated the use of bristles, and in place thereof have substituted finishing elements formed from flexible cloth pads. In a finishing device of this type, the drum is provided with conventional mounting slots extending longitudinally along the periphery thereof, and each slot generally mounts therein a single finishing pad which is provided with an integral loop along one edge thereof. This loop has a suitable shaft or rod positioned therein so that the loop can be retained within the groove on the drum. The pad has a large number of parallel slits which project inwardly from the free edge of the pad so as to form a plurality of elongated flexible strips which effectively contact the vehicle surface to perform the desired finishing operation.

While the use of finishing elements formed as cloth pads has proven highly desirable with respect to the quality of the finishing operation which is performed, and also minimizes any undesirable marring of the vehicle surface, nevertheless these pads do experience substantial wear. In particular, the free ends of the flexible strips experience substantial wear due to their repetitive contact with the surfaces of vehicles, which wear ultimately causes several inches of the strip to tear off of the free end thereof. When this happens, then the strips no longer have sufficient length to achieve the desired finishing contact with the vehicle surface. Hence, this requires that the vehicle finishing apparatus be shut down and the finishing device disassembled to permit new finishing pads to be mounted on the drum. Of most significance, however, is the fact that the entire pad must be replaced even though only a few inches are worn off from the free ends of the strips. Since such pads are of substantial size, they are hence relatively expensive and thus significantly increase the cost of maintaining and operating such apparatus. For this reason, operators hence tend to utilize worn pads for longer periods of time than is desired, and this in turn results in a decrease in the efficiency of the finishing apparatus.

Accordingly, to improve upon the above situation, my copending application Ser. No. 599,407 discloses therein an improved finishing element, specifically a finishing element formed as a cloth pad, which can be readily adjusted in length to compensate for wear and hence overcome the disadvantages associated with prior devices of this type.

More specifically, this invention of my copending application Ser. No. 599,407 relates to a finishing apparatus for finishing a vehicle surface, wherein there is provided a movable support, such as a rotatable drum, having a plurality of flexible finishing elements mounted on and projecting outwardly from the periphery thereof. Each finishing element comprises a flexible cloth pad having a mounting portion adjacent one end thereof for securement to the support, which mounting portion preferably comprises a rod-containing loop positionable within an axially elongated mounting groove formed on the support. The pad, adjacent the one end, is provided with a plurality of mounting portions, such as a plurality of loops, which are disposed in spaced but parallel relationship. The innermost of the loops is initially positioned in the groove to provide a pad having the desired length. As the free end of the pad wears, this innermost loop is removed from the groove and the next loop positioned within the groove so that the length of the pad is increased to compensate for wear. If desired, the stitching or staples which create the inner loop can be removed so as to release the loop from the pad, and hence permit removal of the rod, which rod itself can be utilized in the loop which is positionable in the groove. Alternately, each loop can have its own rod initially stitched therein if desired. Hence, the service life of the pad can be significantly increased by providing the pad with three or four mounting loops to permit compensation for wear at the free ends of the strips. At the same time, the amount of material required to initially form the pad is only slightly increased so as to provide the additional mounting loops.

The present invention relates to further improvements in the finishing element of my aforementioned copending application, and more specifically relates to an improved finishing element of adjustable length which has the mounting portion of the finishing element formed of plastic or other suitable material which can be manufactured efficiently and economically, with the finishing-end portion of the element being constructed of a cloth pad. The finishing element still retains its desirable adjustability to compensate for wear, but at the same time enables the mounting and finishing portions to be constructed of different sheetlike materials so as to significantly increase the economy of manufacture and simplify the manner of use.

Other objects and purposes of the invention will be apparent to persons familiar with apparatus of this general type upon reading the following specification and inspecting the accompanying drawings.

BRIEF DESCRIPTION OF THE DRAWINGS

FIG. 1 is a side elevational view, partially cut away, of a vehicle finishing device having a conventional finishing element mounted thereon.

FIG. 2 is a fragmentary perspective view of a conventional finishing element formed from a cloth pad.

FIG. 3 is a fragmentary perspective view similar to FIG. 2 but illustrating the improved finishing element of this invention as disclosed in my copending application Ser. No. 599,407.

FIG. 4 is an enlarged, fragmentary sectional view illustrating the finishing element of FIG. 3 as mounted on the drum.

Figure 6:
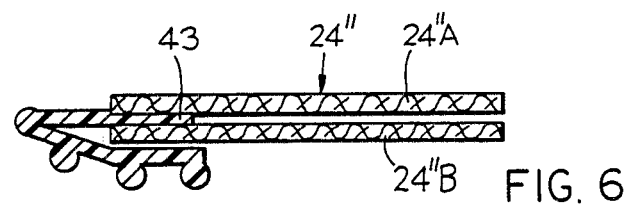
FIG. 6 is a variation of FIG. 5 in that the cloth pad portion can be of a two-ply construction.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and parts thereof. Said terminology will include the words specifically mentioned, derivatives thereof, and words of similar import.

DETAILED DESCRIPTION

FIG. 1 illustrates a portion of a vehicle finishing apparatus 10 which includes a mechanism 11 for biasing a vehicle finishing device 12 against the surface of a vehicle (not shown) to effect finishing of the surface, such as washing, buffing, polishing or drying of the surface. The finishing device 12 is secured to an axle 13 which is rotatably supported on and extends between the arms which form a part of the mechanism 11. This axle 13 in turn is driven by a conventional drive mechanism 14 so as to effect rotation of the finishing device 12 about the axis of the axle 13.

The finishing device 12 comprises a movable support which, in the illustrated embodiment, is a conventional cylindrical drum 16 which surrounds and is releasably coupled to the axle 13 so as to be rotatably driven thereby. This drum 16 has an annular peripheral wall 17 which, on the outer periphery thereof, has a plurality of axially elongated ribs 18 projecting outwardly therefrom. These ribs 18 define a plurality of elongated grooves 19 which extend axially throughout the length of the drum. These grooves 19 have the lower ends thereof closed by a suitable flange associated with the lower end hub of the drum. The grooves 19, which are disposed in closely adjacent but parallel relationship around the complete periphery of the drum, open outwardly but have a reduced width or throat at the radially outer end thereof so as to permit mounting of flexible finishing units 21 on the drum.

A conventional finishing unit 21 is illustrated in FIG. 2, which unit is of the cloth pad type and, in the illustrated embodiment, is of a one-ply thickness. This finishing unit 21 has one edge 22 thereof folded over so as to form a short tab portion 23 which overlaps the main pad portion 24. These two portions 23 and 24 are suitably secured together, such as by stitching or staples 26, so as to form a mounting portion 27, specifically a loop, which extends throughout substantially the complete length of the pad 21. A rigid shaft or rod 28 is positionable within the loop 27. This shaft-containing loop 27 is then positioned within one of the slots 19, such as by being slidably inserted into the slot from the upper end thereof.

The finishing pad 21, when mounted on the drum 16, has the main pad portion 24 disposed so as to project radially outwardly from the drum, particularly when the drum is rotated. To enable the main pad portion 24 to effect the desired finishing contact with the vehicle surface, and at the same time conform to the irregularities of the vehicle surface, the pad 21 is preferably provided with a plurality of elongated cuts or slits 32 which project inwardly from the free edge 31 so as to result in the formation of a plurality of elongated flexible strips 33. These slits 32 normally terminate at a distance of several inches from the mounting loop 27.

Referring now to FIGS. 3 and 4, there is illustrated an improved finishing cloth pad 21' which permits the length of the pad to be selectively adjusted to compensate for wear. This improved pad 21' is identical to the pad 21 of FIG. 2 except that the tab portion 23 is enlarged so as to provide multiple drum mounting portions thereon.

More specifically, as illustrated by FIG. 3, this tab portion 23 is extended to provide a greater overlap with the main pad portion 24. This tab portion 23 in turn has means 36 associated therewith so as to permit the length of the pad, when mounted on the drum, to be adjusted so as to compensate for wear. This length adjusting means 36 includes additional drum mounting portions such as additional loops 27A, 27B and 27C. These latter loops are identical to the main loop 27 and are effectively formed by means such as removable stitching or staples 37. All of the loops 27, 27A, 27B, 27C extend substantially throughout the length of the pad in approximately parallel relationship, and are suitably spaced apart by an intermediate planar pad portion 38 so that the loops are spaced several inches apart. Each of these loops 27, 27A, 27B, 27C is adapted to have a shaft or rod 28 positioned therein. For example, a single rod 28 can be utilized and moved from loop to loop, or alternately each of the loops can have its own individual rod 28 positioned therein.

In utilization of the finishing apparatus, the improved pad 21' is normally mounted on the drum with the innermost loop 27 retained within the drum groove 19. However, after the free ends of the strips 33 become sufficiently worn so as to effect undesirable shortening of the pad, then the loop 27 is removed from the drum groove and the next loop 27A slidably inserted into the groove to effect lengthening of the main pad portion 24 so as to compensate for wear.

After the loop 27 has been removed from the drum groove 19, then the securing means such as the stitching or staples 26 can be removed so as to open up the loop and permit removal of the rod 28. If the next loop 27A is not initially provided with a rod therein, then the rod 28 from the loop 27 is inserted into the loop 27A so as to permit securement of this latter loop within the respective groove 19. On the other hand, if each of the loops is initially provided with its own rod 28 securely held therein, then the rod 28 removed from the loop 27 can be discarded.

After the pad undergoes additional wear so as to effect undesired shortening thereof, then the same procedure is followed with respect to the remaining loops 27B and 27C so as to effectively adjust the length of the main pad portion 24 so as to compensate for wear.

Hence, providing the pad 21' with the three additional mounting loops thereon hence enables the life of the pad to be effectively quadrupled. At the same time, the pad is of only minimal additional expense to produce since it requires only a minimal percentage increase in material so as to permit formation of the adjustable length means 36 illustrated by FIG. 4.

The material for the cloth pad is typically a nonwoven felt secured to a suitable substrate, such material being conventional, although other types of materials or flexible cloths can also be utilized.

In addition, while the pad is illustrated as being of a single ply, it will be appreciated that the pad could be of a multiple-ply construction merely by positioning one or more plies of material in overlying relationship to the main pad portion, with these additional plies being secured by stitching or the like. This type of multiple-ply construction is also conventional.

The adjustable-length finishing pad of FIGS. 3 and 4 is illustrated and described in greater detail in my aforementioned copending application Ser. No. 599,407, filed Apr. 12, 1984, the disclosure of which application is incorporated herein by reference.

Figure 5:
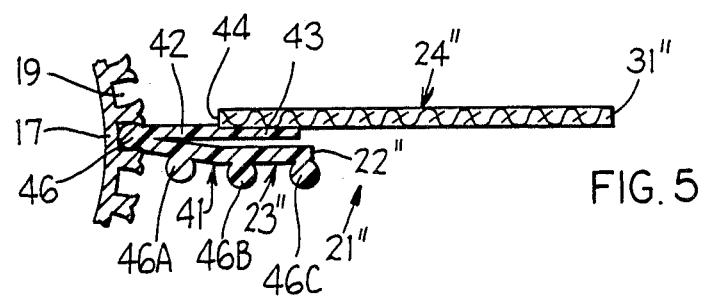
FIG. 5 is a fragmentary sectional view illustrating a variation in the improved finishing element.

Referring now to FIG. 5, there is illustrated an improved adjustable-length finishing unit which possesses all of the advantages of the unit 21 illustrated by FIGS. 3 and 4, but which in addition possesses further advantages with respect to its economy of manufacture and ease of use.

Referring to FIG. 5, there is illustrated a modified finishing unit 21" which possesses the same structural and functional characteristics as the unit 21' illustrated in FIG. 4, and hence many of the same reference numerals have been utilized to designate corresponding parts. This improved unit 21", however, while constructed of flexible sheetlike material, is in this instance constructed from two such materials which are fixedly secured together, rather than utilizing a single material as in the FIG. 4 embodiment.

More specifically, the unit 21" of FIG. 5 again employs a main pad portion 24" which projects inwardly from the free edge 31" of the sheet or pad structure. This main pad portion 24" is preferably a cloth pad which is provided with a plurality of elongated cuts or slits (not shown) which project inwardly from the free edge 31" thereof so as to result in a plurality of elongated flexible strips substantially as illustrated by FIG. 3. The cuts or slits normally terminate at a distance which is several inches from the other edge 44 of the main pad portion 24".

The sheet or pad structure defining the finishing unit 21" also includes a flexible sheetlike mounting portion 41, the latter including a substantially planar and flexible sheetlike portion 42 which is fixed to and effectively constitutes an extension of the main cloth pad portion 24". For this purpose, the sheetlike portion 42 has a part 43 thereof which overlaps the cloth pad portion 24" adjacent the rear edge 44 thereof, which overlapping portions are suitably fixedly secured together, as by stitching or the like.

The mounting portion 41, which extends from the cloth pad portion to the other free edge 22" of the pad structure, includes a plurality of mounting parts 46, 46A, 46B and 46C fixedly associated with the flexible sheet structure 42 for permitting attachment to the drum 17. These mounting parts 46-46C are identical and effectively correspond to and function equivalent to the loops 27-27C of FIG. 4. That is, these mounting parts 46-46C individually extend throughout the complete length of the pad structure in approximately parallel relationship, and are suitably spaced several inches apart by intermediate portions of the sheet 42, whereby the individual mounting parts 46-46C are hence spaced varying distances from the free edge 22" of the tab portion 23".

Each of the mounting parts 46-46C, in this embodiment, is constructed substantially as a closed loop which, in this illustrated embodiment, is solid so as to effectively comprise a cylindrical rod. The mounting part 46-46C hence is equivalent to the loop 27 containing therein the rod 28 as illustrated in FIG. 4. Use of a separate rod, such as the rod 28 illustrated in FIG. 4, is not required. The mounting portion 41 of the pad structure is preferably constructed of any desirable low-cost material which can be economically formed as an integral structure, such as by being extruded of a plastics material (such as a polyvinyl plastics material) so that the mounting parts 46-46C are integral with the thin flexible sheet portion 42. This hence enables the pad portion 42 to be suitably flexed as desired depending upon which of the mounting parts 46-46C is positioned within the groove 19 of the drum 17.

As with the embodiment of FIG. 4, the pad structure 21" is mounted on the drum with the innermost mounting part 46 retained within the drum groove 19. However, after the free edge of the cloth pad portion 24" has sufficiently worn so as to effect undesired shortening of the pad structure, then the mounting part 46 is slidably removed from the drum groove and the next mounting part 46A slidably inserted into the groove to effect lengthening of the main pad portion 24" so as to compensate for wear. With this arrangement, after the pad structure has been repositioned so as to adjust the length thereof, no additional manipulation is required since the previously-used mounting part 46 merely remains attached to the flexible pad structure and does not create any problem in-as-much as it is positioned closely adjacent the periphery of the drum. The manipulating of separate rods, and/or the removing of stitches so as to open the loops, such as with the embodiment illustrated by FIG. 4, is hence not required.

FIG. 6 illustrates a finishing unit identical to that of FIG. 5 except that the main cloth pad portion 24" is of a two-ply construction in that separate cloth pads 24"A and 24"B can be easily attached on opposite sides of the mounting portion 43 so as to provide a desirable two-ply construction.

While the illustrated embodiment disclosed a rotatable drum as the support for the finishing units, it will be appreciated that the movable support (i.e. the drum) could assume other shapes, such as endless belts having individually mounted longitudinal cloth holding strips attached thereto.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vehicle finishing apparatus having a rotary support, and a plurality of finishing units mounted on said support in spaced relationship therearound, each finishing unit including a thin sheetlike pad structure of flexible material having an outer free edge adapted to contact a vehicle, said pad structure having an inner edge positioned adjacent the periphery of the support, the improvement comprising mounting means cooperating between said support and said pad structure for releasably securing said pad structure to said support and for selectively varying the point of attachment thereof to said support to vary the length of said pad structure which projects outwardly from said support, said mounting means including a plurality of identical first mounting parts fixedly associated with said pad structure in substantially parallel but closely spaced relationship in the vicinity of said inner edge but progressively spaced therefrom, each said first part comprising a rodlike structure which is fixed to said pad structure and elongated substantially parallel with said inner edge, and said mounting means including a plurality of second mounting parts provided on and disposed around said rotary support, said second mounting part being releasably engaged with a selected one of said first mounting parts for attaching said pad structure to said rotary support.

2. A finishing apparatus according to claim 1, wherein said rodlike structure comprises a solid rodlike element of substantially cylindrical cross section, said rodlike element being fixedly secured to said pad structure and projecting outwardly from one side thereof.

3. A finishing apparatus according to claim 2, wherein said pad structure includes a thin and flexible sheetlike outer portion constructed of a clothlike material, and a thin and flexible sheetlike inner portion which is fixed to and effectively constitutes an extension of said outer portion, said inner portion being of a dissimilar material, and said plurality of first mounting parts being fixedly associated with said inner portion.

4. A finishing apparatus according to claim 3, wherein said sheetlike inner portion is constructed of a plastics material and has said first mounting parts integrally formed therewith.

5. A finishing apparatus according to claim 1, wherein each said rodlike structure comprises an elongated rodlike element which extends substantially parallel with said inner edge and projects outwardly beyond one side surface of said pad structure for attachment with the rotary support.

6. A finishing apparatus according to claim 1, wherein said pad structure includes a thin and flexible sheetlike outer portion constructed of a clothlike material, and a thin and flexible sheetlike inner portion which is fixed to and effectively constitutes an extension of said outer portion, said inner portion being of a dissimilar material, and said plurality of first mounting parts being fixedly associated with said inner portion.

7. A finishing apparatus according to claim 6, wherein said sheetlike inner portion is of a plastics material and has said first mounting parts integrally formed thereon.

8. A finishing apparatus according to claim 7, wherein each said rodlike structure comprises an elongated rodlike element which extends substantially parallel with said inner edge and projects outwardly beyond one side surface of said sheetlike inner portion for attachment with the rotary support.

9. A finishing apparatus according to claim 7, wherein said second mounting part includes a wall arrangement fixedly related to said rotary support and which defines therein a groove which is elongated axially and opens radially of said rotary support, one of the first mounting parts as associated with a respective pad structure being stationarily but removably confined within said groove.

* * * * *